United States Patent
Charles et al.

(10) Patent No.: US 8,258,970 B2
(45) Date of Patent: Sep. 4, 2012

(54) DETECTION OF THE PRESENCE OF A CONTACTLESS COMMUNICATION ELEMENT WITHIN THE RANGE OF A TERMINAL

(75) Inventors: Alexandre Charles, Auriol (FR);
Jérôme Conraux, Trets (FR);
Alexandre Malherbe, Trets (FR);
Alexandre Tramoni, Saint Aygulf (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 463 days.

(21) Appl. No.: 12/508,341

(22) Filed: Jul. 23, 2009

(65) Prior Publication Data
US 2010/0019885 A1    Jan. 28, 2010

(30) Foreign Application Priority Data
Jul. 25, 2008  (FR) .................................... 08 55110

(51) Int. Cl.
*G08B 21/00*    (2006.01)
(52) U.S. Cl. ............... 340/660; 340/10.1; 331/14
(58) Field of Classification Search .......... 340/660, 340/10.1, 10.3, 10.4, 10.41, 10.42, 572.4; 331/14, 16; 455/183.1
See application file for complete search history.

(56) References Cited

U.S. PATENT DOCUMENTS

| | | | |
|---|---|---|---|
| 3,991,382 A * | 11/1976 | Iida et al. | 331/14 |
| 4,061,980 A * | 12/1977 | Sato | 455/158.3 |
| 6,317,027 B1 | 11/2001 | Watkins | |
| 6,531,957 B1 | 3/2003 | Nysen | |
| 6,580,358 B1 * | 6/2003 | Nysen | 340/10.1 |
| 2007/0236336 A1 | 10/2007 | Borcherding | |

OTHER PUBLICATIONS

French Search Report dated Mar. 3, 2009, from French Application No. 08/55110.

* cited by examiner

*Primary Examiner* — John A Tweel, Jr.
(74) *Attorney, Agent, or Firm* — Wolf, Greenfield & Sacks, P.C.

(57) ABSTRACT

A method of detection of the presence of a contactless communication element by a terminal emitting an electromagnetic field, in which an oscillating circuit of the terminal is excited at a frequency which is made variable between two values surrounding a nominal tuning frequency of the oscillating circuit; a signal representative of the load of the oscillating circuit being interpreted to detect that a reference voltage has not been exceeded, which indicates the presence of an element in the field. A presence-detection circuit and a corresponding terminal.

22 Claims, 3 Drawing Sheets

DETECTION OF THE PRESENCE OF A CONTACTLESS COMMUNICATION ELEMENT WITHIN THE RANGE OF A TERMINAL

CROSS REFERENCE TO RELATED APPLICATIONS

This application claims the priority benefit of French patent application number 08/55110, filed on Jul. 25, 2008, entitled "DETECTION OF THE PRESENCE OF A CONTACTLESS COMMUNICATION ELEMENT WITHIN THE RANGE OF A TERMINAL," which is hereby incorporated by reference to the maximum extent allowable by law.

BACKGROUND OF THE INVENTION

1. Field of the Invention

The present invention generally relates to electronic circuits and, more specifically, to terminals of contactless communication with distant elements of electromagnetic transponder type.

The present invention more specifically applies to short-range communication systems (with a range shorter than a few meters), for example Near Field Communication (NFC) systems.

2. Discussion of the Related Art

In near field communication systems for which the power consumption of the terminal is not a concern, said terminal periodically transmits (for example, every half second) an interrogation frame intended for transponders likely to be located in its field. When a transponder receives this frame, it responds thereto. The interrogation frame amounts to modulating a carrier according to a predefined coding. The carrier corresponds to an A.C. signal at the frequency on which the oscillating circuits of the terminal and of the transponder are tuned.

For systems in which the terminal power consumption is desired to be minimized, such interrogation frames are only transmitted when a transponder has been previously detected by the terminal. For this purpose, one uses the fact that the resonant circuit comprised by the transponder forms, even in the absence of a transmission, a load on the oscillating circuit of the terminal in the field of which it is located. This load variation in the presence of a transponder is then detected to consider that a transponder is present in the field and is capable of communicating with the terminal. Generally, the terminal periodically excites (for example, every half second) its oscillating circuit without modulating the carrier with data and detects a possible decrease in the voltage across the antenna with respect to a reference value. This enables decreasing the power consumption of the terminal.

However, for the detection to be reliable, the excitation frequency of the oscillating circuit must be accurate. The generation of such a frequency conventionally requires a quartz oscillator. Such an oscillator generates a relatively high consumption on each starting of the quartz oscillator.

Further, in the presence of a transponder having a resonant circuit which is not perfectly tuned, there is a risk of detection errors.

SUMMARY OF THE INVENTION

It would be desirable to have a circuit for detecting the presence of an electromagnetic transponder in the field of a terminal, which overcomes all or part of the disadvantages of usual circuits.

It would in particular be desirable to avoid using a quartz oscillator in presence-detection phases.

It would further be desirable to make the operation of the detector independent from possible drifts in the tuning frequency of the resonant circuit of the terminal or of the transponder.

To achieve all or part of these objects as well as others, an embodiment of the present invention provides a method of detection of the presence of a contactless communication element by a terminal emitting an electromagnetic field, in which:

an oscillating circuit of the terminal is excited at a frequency which is made variable between two values surrounding a nominal tuning frequency of the oscillating circuit; and a signal representative of the load of the oscillating circuit is interpreted to detect that a reference voltage has not been exceeded, which indicates the presence of an element in the field.

According to an embodiment of the present invention, several cycles of excitation at variable frequency are transmitted at regular intervals.

According to an embodiment of the present invention, the representative signal is the voltage of an antenna for emitting the field.

An embodiment of the present invention also provides a method for controlling a terminal emitting an electromagnetic field for communication with a contactless element, in which communication phases are triggered when an element is detected in the field, a quartz oscillator being used during communication phases.

An embodiment of the present invention also provides a circuit of detection of the presence of a contactless communication element, by a terminal emitting a radiofrequency field, comprising:

a variable-frequency oscillator intended to excite an oscillating circuit of the terminal; and a comparator of a quantity representative of the load of the oscillating circuit with respect to a reference value.

According to an embodiment of the present invention, this circuit is capable of implementing the presence-detection method.

An embodiment of the present invention also provides a terminal of communication with at least one contactless communication element, comprising such a detection circuit.

According to an embodiment of the present invention, the terminal further comprises a quartz oscillator.

The foregoing objects, features, and advantages of the present invention will be discussed in detail in the following non-limiting description of specific embodiments in connection with the accompanying drawings.

DETAILED DESCRIPTION

Figure 1:
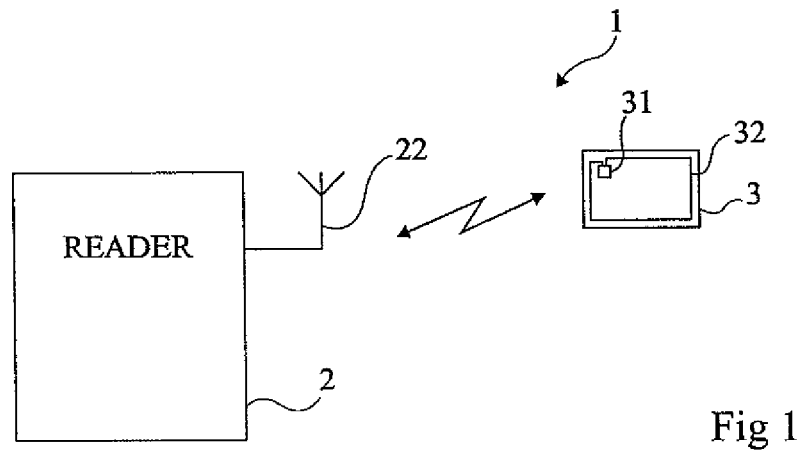
FIG. 1 is a block diagram of a communication system of the type to which the present invention applies as an example.

The same elements have been designated with the same reference numerals in the different drawings, and the timing diagrams of FIGS. 4A to 4D have been drawn out of scale.

For clarity, only those steps and elements which are useful to the understanding of the present invention have been shown and will be described. In particular, the interpretation by the terminal of the detection of the presence of a transponder has not been detailed, the present invention being compatible with any usual exploitation of such a detection. Further, the communication frames between terminal and transponder have not been detailed either, the present invention being here again compatible with conventional communication modes.

FIG. 1 is a simplified representation of a system 1 of near-field communication between a read or read-write terminal 2 (READER) and a contactless communication element or transponder 3 (in this example, a chip card). Typically, transponder 3 comprises one or several electronic circuits 31 and an antenna 32 capable of sensing a field radiated by an antenna 22 of terminal 2. Generally, circuits 31 of the transponder extract the power supply necessary to their operation from the field radiated by terminal 2.

For example, transponder 3 is a contactless card, a miniature or portable electronic circuit, etc. and terminal 2 is an access or ticket validation terminal, a payment terminal, etc. In another example of application, terminal 2 is itself formed of a battery-powered portable device (for example, a cell phone).

Figure 2:
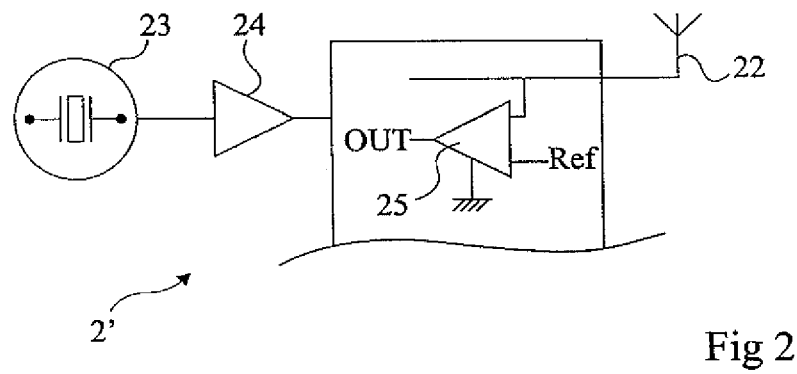
FIG. 2 is a partial simplified diagram of a usual detector of the presence of a transponder in the field of a terminal.

FIG. 2 is a partial simplified block diagram of elements of a terminal 2' currently used for the detection of the presence of a transponder in the field radiated by antenna 22. Typically, a quartz oscillator 23 is used to excite, via an amplifier 24, the oscillating circuit of the terminal (not shown, except for antenna 22). The voltage across antenna 22 is compared (comparator 25) with a reference Ref to detect the possible presence of a transponder. This presence translates as a variation in the level of the voltage across the antenna which, when a transponder is present, becomes smaller than the reference level and causes a switching of output signal OUT of comparator 25 between its two binary states.

Quartz oscillator 23 should be tuned to the resonance frequency of the system (for example, 13.56 Megahertz) to be able to detect the field variation in the presence of a transponder having its resonant circuit itself tuned to this 13.56-Megahertz frequency. However, in case of a shift of this resonance frequency, the circuit risks making detection errors.

Further, the use of a quartz during wait-for-communication phases (during presence detection phases) results in a quasi-permanent relatively large consumption.

Figure 3:
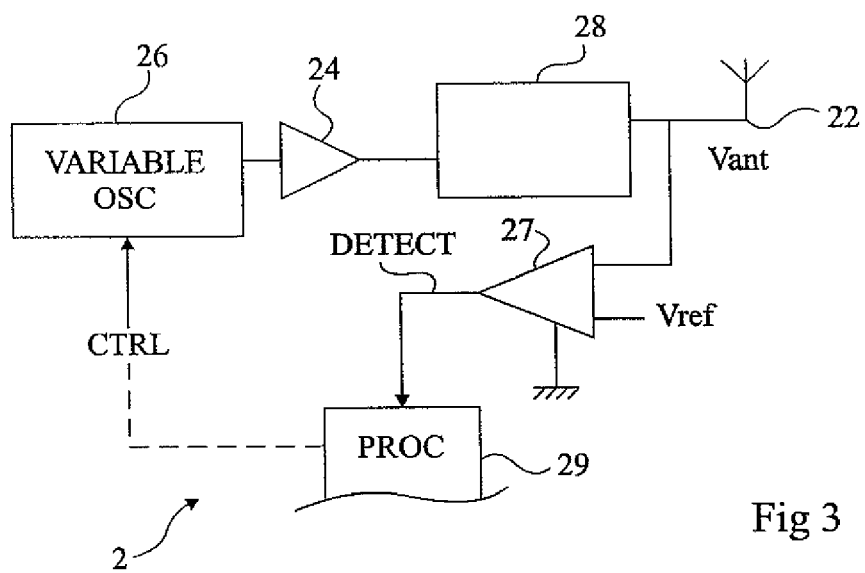
FIG. 3 is a simplified block diagram of an embodiment of a detector of the presence of a contactless communication element in the field of a terminal.

FIG. 3 is a block diagram to be compared with that of FIG. 2 illustrating an embodiment of a detector of the presence of a transponder equipping a contactless communication terminal 2. It shows an antenna 22 capable of being excited via an amplifier 24 and belonging to an oscillating circuit (schematized by a block 28).

According to this embodiment, when terminal 2 is in presence-detection mode, its oscillating circuit is excited by a signal provided by a variable-frequency oscillator 26 (VARIABLE OSC). Voltage Vant across antenna 22 is compared with a reference voltage Vref to detect (signal DETECT at the output of a comparator 27) the possible presence of a transponder.

Oscillator 26 is controlled (signal CTRL), for example, by a variable voltage source or current source to periodically vary its frequency along time in a transponder search period. Oscillator 26 needs not be accurate since an entire frequency range around the tuning frequency is scanned during the detection period.

The control of the different components of the terminal and the interpretation of the detection are performed, for example, by a processing circuit 29. Such a circuit is, for example, a digital processor (microprocessor or other) used for the other tasks of the terminal. The programming of such a circuit enables to generate the periodic cycles of the variable-frequency excitation signal.

Figure 4A:
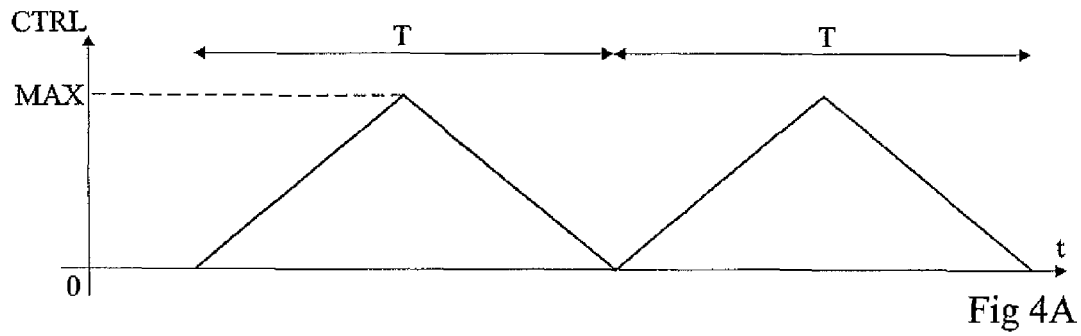
FIGS. 4A, 4B, 4C, and 4D are timing diagrams illustrating an embodiment of the contactless communication element detection method.
Figure 4B:
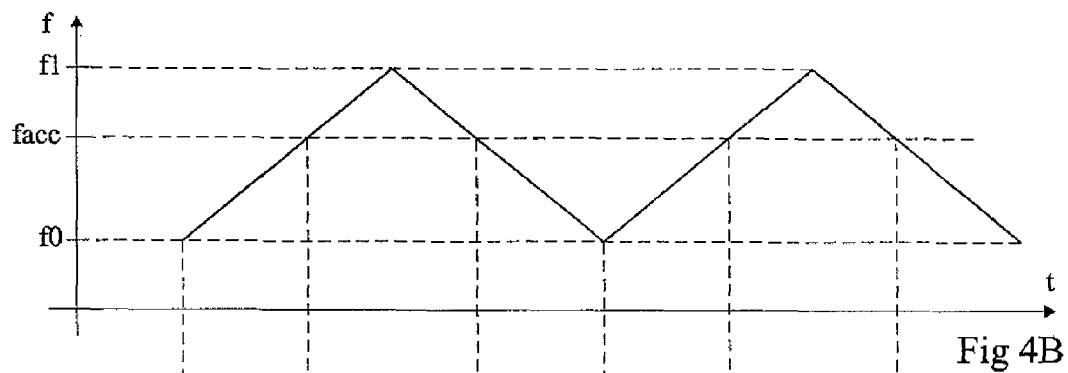
Figure 4C:
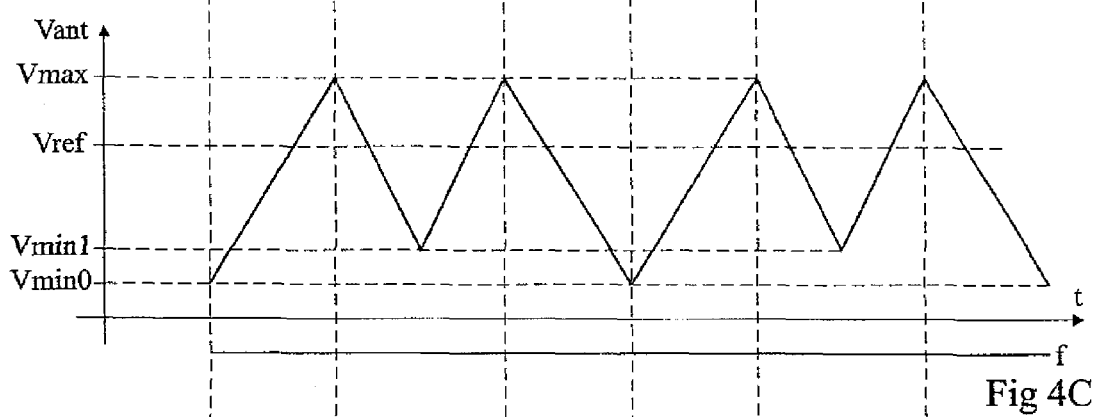
Figure 4D:
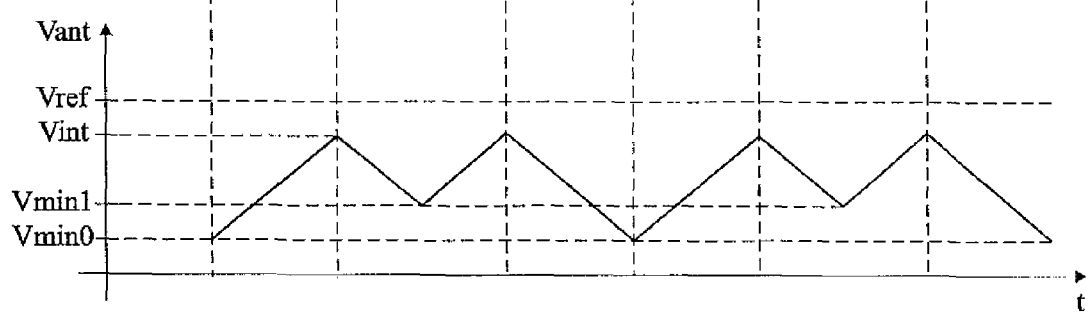

FIGS. 4A, 4B, 4C, and 4D are timing diagrams illustrating an example of operation of the terminal of FIG. 3. FIG. 4A is an example of the shape of control signal CTRL of variable oscillator 26. FIG. 4B is an example of the shape of frequency f of the signal provided by oscillator 26 along time. FIGS. 4C and 4D are examples of the shape of voltage Vant across the antenna, respectively in the absence of a transponder in the field and in the presence of such a transponder.

It is assumed that a presence-detection phase comprises periodically transmitting (for example, every second or every half-second) a signal of variable frequency between two frequencies f0 and f1 surrounding the theoretical tuning frequency $f_{acc}$ of the oscillating circuit of the terminal. In the example of FIGS. 4A to 4D, it is assumed that this frequency variation is performed during two periods T in which (FIG. 4B) the frequency increases between values f0 and f1 to decrease in the second portion of each period. FIG. 4A illustrates the example of a control signal used to make a voltage or a current from a voltage or current source of variable oscillator 26 increase. This signal increases between a zero value for which oscillator 26 is at a frequency which approximately corresponds to frequency f0 and a maximum value MAX for which the oscillator is at a frequency which approximately corresponds to frequency f1.

In the absence of an electromagnetic transponder in the field (FIG. 4C), voltage Vant across the antenna starts from a minimum Vmin at frequency f0, to reach a maximum Vmax when the tuning frequency has been reached, then decreases down to a value Vmin1 at frequency f1. Values Vmin0 and Vmin1 are not necessarily identical. When the frequency decreases between frequencies f1 and f0, voltage Vant starts by increasing from voltage Vmin1 to reach voltage Vmax, then decreases to value Vmin0.

If a transponder is present in the field (FIG. 4D), it modifies the load of the resonant circuit essentially at tuning frequency $f_{acc}$. As a result, levels Vmin0 and Vmin1 are not necessarily modified or are only slightly so. However, voltage Vant does not reach voltage Vmax, but stops at a lower value Vint.

By selecting reference value Vref of the comparator between the expected values Vint and Vmax, the output of comparator 27 switches twice per period T of the control signal, except in the presence of a transponder.

Figure 5:
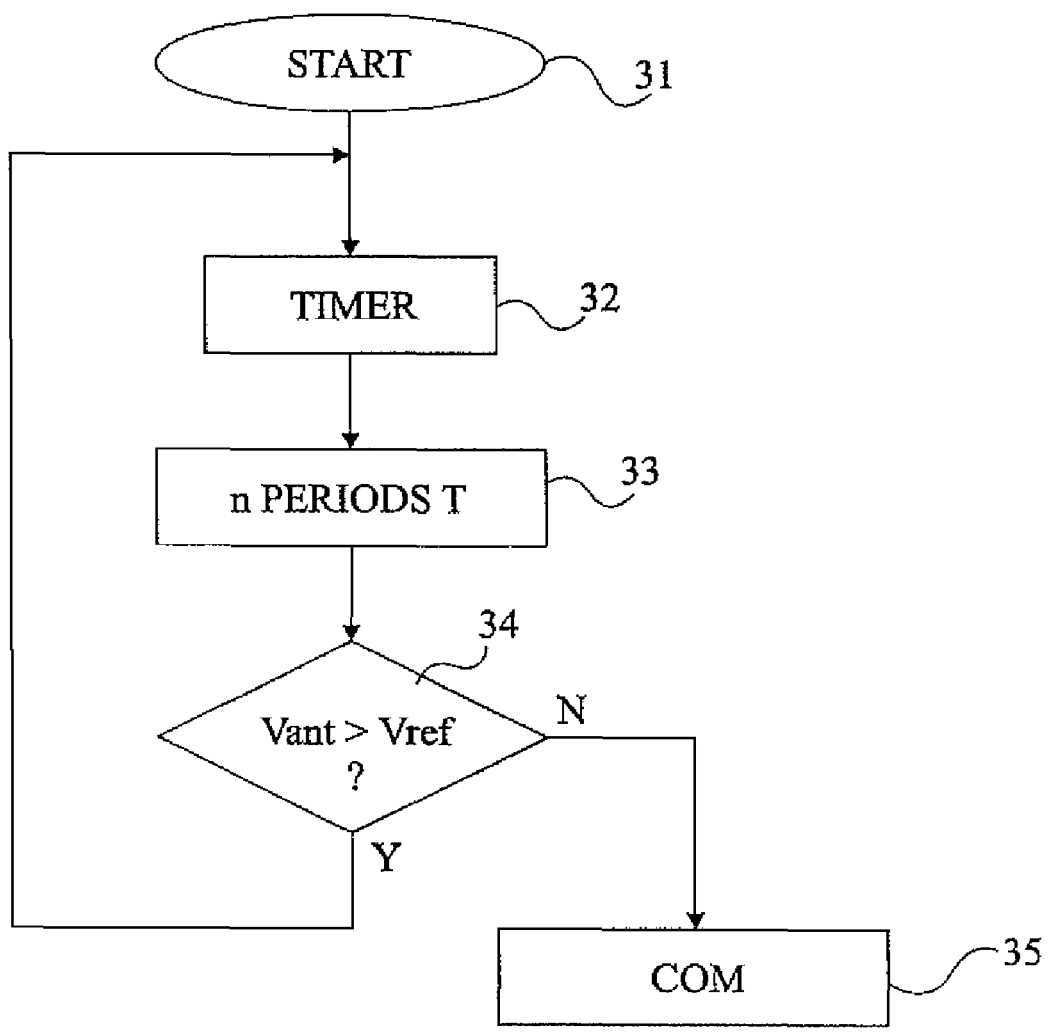
FIG. 5 is a block diagram of an embodiment of the presence-detection method.

FIG. 5 is a simplified flowchart illustrating an embodiment of the detection method.

Once the reader has been initialized (block 31, START), its electronic circuits start a time counter (block 32, TIMER) to periodically transmit a number n (2 in the example of FIG. 4A) of variable-frequency cycles T (block 33, n PERIODS T). The voltage across the antenna is compared (block 34, Vant>Vref?) with the reference voltage to detect the presence or the absence of a crossing of this reference voltage. If such a crossing has occurred (output Y of block 34), the process is resumed at the level of timer 32. If not (output N of block 34), this means that a transponder is present and the terminal can then initiate a communication (block 35, COM) by transmitting a usual interrogation frame. This amounts to waking up the circuits of the terminal in a mode where they consume more than in detection mode. In particular, the terminal then uses its quartz oscillator to generate a precise frequency on which the transmission carrier is based (for example, 13.56 MHz).

Comparison 34 may be performed in timed fashion to take into account the time window in which the n cycles are transmitted. As a variation, voltage Vant is averaged and threshold Vref is selected accordingly.

It is now possible to detect the presence of a transponder without requiring a quartz oscillator.

An induced advantage is that, even if the oscillating circuits of the transponder and/or of the terminal are out of tune with respect to a nominal value, the detection is still performed. Indeed, whatever the resonance frequency between frequencies f0 and f1, the system will necessarily transit through a voltage maximum across the antenna. Accordingly, it is enough to appropriately select threshold Vref to be able to detect the presence of a transponder, even in case of a drift of the respective tuning frequencies of the terminal and of the transponder.

The fact of not using a quartz oscillator enables to decrease the power consumption during the detection phase. Now, detection phases are generally predominating in the use of a terminal (communication periods are often short with respect to waiting periods). The saving is thus significant in terms of power consumption.

As a specific embodiment applied to a nominal resonance frequency of 13.56 megahertz, frequencies f0 and f1 are approximately 8 and 20 megahertz.

Various embodiments have been described, and various alterations and modifications will occur to those skilled in the art. In particular, the practical forming of the circuits required for the described presence detection is within the abilities of those skilled in the art based on the functional indications given hereinabove and by using circuits which are themselves current. For example, instead of a voltage- or current-controlled oscillator, the charge and the discharge of constant-current capacitive elements may be exploited to obtain the variable-frequency oscillator. According to another specific embodiment, the oscillator is formed of several inverters in series, supplied with a variable voltage.

Further, although reference has been made to a measurement of the voltage of the antenna (with respect to ground), any signal influenced by the load formed by a transponder in the field of the terminal may be exploited.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of detection of the presence of a contactless communication element by a terminal emitting an electromagnetic field, wherein:
    an oscillating circuit of the terminal is excited at a frequency which is made variable between two values surrounding a nominal tuning frequency of the oscillating circuit; and
    a signal representative of the load of the oscillating circuit is interpreted to detect that a reference voltage has not been exceeded, which indicates the presence of an element in the field.

2. The method of claim 1, wherein said terminal comprises a quartz oscillator, which is not used during a phase where the oscillating circuit of the terminal is excited at said frequency which is made variable.

3. The method of claim 1, wherein several cycles of excitation at variable frequency are transmitted at regular intervals.

4. The method of claim 1, wherein the representative signal is the voltage of an antenna for emitting the field.

5. A method for controlling a terminal emitting an electromagnetic field for communication with a contactless element, wherein communication phases are triggered when an element is detected in the field according to the method of claim 1, a quartz oscillator being used during communication phases.

6. A circuit of detection of the presence of a contactless communication element by a terminal emitting a radiofrequency field, and having a quartz oscillator, comprising:
    a variable-frequency oscillator intended to excite an oscillating circuit of the terminal; and
    a comparator of a quantity representative of the load of the oscillating circuit with respect to a reference value, the circuit configured to implement the method of claim 1.

7. A terminal of communication with at least one contactless communication element, comprising the circuit of claim 6.

8. The terminal of claim 7, further comprising a quartz oscillator.

9. A circuit configured to detect the presence of a transponder, comprising:
    an antenna associated with a resonant circuit;
    a variable frequency oscillator configured to excite the resonant circuit at a frequency that is variable about a resonant frequency of the resonant circuit;
    a comparator configured to compare a value representative of a load on the resonant circuit at the resonant frequency with a reference value; and
    a processing circuit configured to detect the presence of a transponder based on a result of the comparison.

10. A circuit as defined in claim 9, wherein the value representative of the load on the resonant circuit comprises an antenna voltage of the antenna.

11. A circuit as defined in claim 10, wherein the presence of a transponder is detected when the antenna voltage at the resonant frequency is less than the reference value.

12. A circuit as defined in claim 9, wherein the processing circuit is configured to vary the frequency of the variable frequency oscillator above and below the resonant frequency of the resonant circuit.

13. A circuit as defined in claim 9, wherein the processing circuit is configured to trigger a detection phase at intervals, the detection phase including one or more variable frequency periods.

14. A circuit as defined in claim 13, wherein the comparator switches state twice per variable frequency period, except in the presence of a transponder.

15. A circuit as defined in claim 13, wherein the processing circuit is further configured to trigger a communication phase when the presence of a transponder is detected.

16. A method for detecting the presence of a transponder by a terminal, comprising:
    exciting a resonant circuit associated with an antenna at a frequency that is variable about a resonant frequency of the resonant circuit;
    comparing a value representative of a load on the resonant circuit at the resonant frequency with a reference value; and detecting the presence of a transponder based on a result of the comparison.

17. A method as defined in claim 16, wherein the value representative of the load on the resonant circuit comprises an antenna voltage of the antenna.

18. A method as defined in claim 17, wherein the presence of a transponder is detected when the antenna voltage at the resonant frequency is less than the reference value.

19. A method as defined in claim 16, wherein exciting the resonant circuit comprises varying the frequency of an oscillator that excites the resonant circuit above and below the resonant frequency of the resonant circuit.

20. A method as defined in claim 16, further comprising triggering a detection phase at intervals, each detection phase including one or more variable frequency periods.

21. A method as defined in claim 20, wherein the result of the comparison switches state twice per variable frequency period, except in the presence of a transponder.

22. A method as defined in claim 16, further comprising triggering a communication phase in response to detecting the presence of a transponder.

* * * * *